United States Patent
Büttner et al.

(10) Patent No.: US 10,910,919 B2
(45) Date of Patent: Feb. 2, 2021

(54) DYNAMOELECTRIC MACHINE HAVING A THERMOSIPHON

(71) Applicant: SIEMENS AKTIENGESELLSCHAFT, Munich (DE)

(72) Inventors: Klaus Büttner, Hollstadt (DE); Klaus Kirchner, Ostheim (DE); Matthias Warmuth, Windshausen (DE)

(73) Assignee: Siemens Aktiengesellschaft, Munich (DE)

( * ) Notice: Subject to any disclaimer, the term of this patent is extended or adjusted under 35 U.S.C. 154(b) by 258 days.

(21) Appl. No.: 16/304,036

(22) PCT Filed: May 5, 2017

(86) PCT No.: PCT/EP2017/060752
§ 371 (c)(1),
(2) Date: Nov. 21, 2018

(87) PCT Pub. No.: WO2017/207212
PCT Pub. Date: Dec. 7, 2017

(65) Prior Publication Data
US 2020/0303996 A1    Sep. 24, 2020

(30) Foreign Application Priority Data
Jun. 3, 2016 (EP) .................................. 16172866

(51) Int. Cl.
*H02K 9/20* (2006.01)
*H02K 7/00* (2006.01)
*H02K 9/06* (2006.01)

(52) U.S. Cl.
CPC ............... *H02K 9/20* (2013.01); *H02K 7/003* (2013.01); *H02K 9/06* (2013.01)

(58) Field of Classification Search
CPC ......... H02K 7/1823; H02K 15/00; H02K 9/20
(Continued)

(56) References Cited

U.S. PATENT DOCUMENTS 7,327,055 B2 *   2/2008  Devine .................. H02K 1/278
                                                 310/58
8,896,167 B2 *  11/2014  McKinzie ................ H02K 9/19
                                                 310/61

(Continued)

FOREIGN PATENT DOCUMENTS

DE    10 2009 051 114 A1    5/2011
DE    10 2014 202 055 A1    8/2015
(Continued)

OTHER PUBLICATIONS

PCT International Search Report and Written Opinion of International Searching Authority dated Apr. 25, 2018 corresponding to PCT International Application No. PCT/EP2017/060752 filed May 5, 2017.

(Continued)

*Primary Examiner* — Jose A Gonzales Quinones
(74) *Attorney, Agent, or Firm* — Henry M. Feiereisen LLC

(57) ABSTRACT

A hollow shaft forms a closed-off cavity and has, axially, at least an evaporator zone and a condenser zone. At least the condenser zone has a microscale structure. The evaporator zone and the condenser zone can be connected in a thermally conductive manner to the respective surrounding elements thereof.

16 Claims, 4 Drawing Sheets

(58) Field of Classification Search
USPC .................................. 310/52, 54, 60 A, 61
See application file for complete search history.

(56) References Cited

U.S. PATENT DOCUMENTS

| | | | |
|---|---|---|---|
| 9,257,883 B2 | 2/2016 | Buettner et al. | |
| 2005/0194847 A1* | 9/2005 | Gromoll | H02K 9/14 310/54 |
| 2007/0096588 A1 | 5/2007 | Kirchner et al. | |
| 2007/0199339 A1* | 8/2007 | Ishihara | B60K 7/0007 62/242 |
| 2008/0309174 A1* | 12/2008 | Jockel | H02K 9/22 310/54 |
| 2012/0133236 A1 | 5/2012 | Buettner et al. | |
| 2012/0205996 A1 | 8/2012 | Buttner et al. | |
| 2013/0187512 A1 | 7/2013 | Buettner et al. | |
| 2015/0344263 A1 | 12/2015 | Novotny et al. | |
| 2016/0056674 A1 | 2/2016 | Buettner et al. | |
| 2016/0138815 A1* | 5/2016 | Swett | F25B 3/00 62/115 |
| 2017/0012481 A1 | 1/2017 | Buettner et al. | |
| 2017/0170703 A1 | 6/2017 | Buettner et al. | |
| 2018/0054108 A1* | 2/2018 | Muller | F28D 15/04 |
| 2018/0083500 A1 | 3/2018 | Buettner et al. | |

FOREIGN PATENT DOCUMENTS

| | | |
|---|---|---|
| SU | 675539 A1 | 7/1979 |
| SU | 678599 A1 | 8/1979 |
| SU | 1520630 A1 | 11/1989 |

OTHER PUBLICATIONS

Buettner et al, U.S. Pat. No. 10,090,719, Oct. 2, 2018, 2016-0056673-A1, Feb. 25, 2016.

Buettner et al, U.S. Pat. No. 10,027,211, Jul. 17, 2018, 2015-0349616, Dec. 3, 2015.

Buettner et al, U.S. Pat. No. 9,935,519, Apr. 4, 2018, 2015-0214810-A1, Jul. 30, 2015.

Buettner et al, U.S. Pat. No. 9,876,411, Jan. 23, 2018, 2015-0207378-A1, Jul. 23, 2015.

Buettner et al, U.S. Pat. No. 9,787,164, Oct. 10, 2017. 2015-0042185-A1, Feb. 12, 2015.

Buettner et al, U.S. Pat. No. 9,768,666, 2014-0217840-A1, Aug. 7, 2014.

Buettner et al, U.S. Pat. No. 9,281,728, Mar. 8, 2016, 2013-0257197, Oct. 3, 2013.

Buettner et al, U.S. Pat. No. 9,287,754, Mar. 15, 2016, 2013-0234543, Sep. 12, 2013.

Buettner et al, U.S. Pat. No. 9,515,536, Dec. 6, 2016, 2012/0169158 A1, Jul. 5, 2012.

Buettner et al, U.S. Pat. No. 8,963,394, Feb. 24, 2015, 2012/0187796, Jul. 26, 2012.

Buettner et al, U.S. Pat. No. 8,836,193, Dec. 29, 2011, 2011/0316380 A1, Dec. 29, 2011.

Buettner et al, U.S. Pat. No. 9,252,642, Feb. 2, 2016, 2012/0205996, Aug. 16, 2012.

Buettner et al, U.S. Pat. No. 9,154,017, Oct. 6, 2015, 2013-0175892, Jul. 11, 2013.

Buettner et al, U.S. Pat. No. 9,800,103, Oct. 24, 2017, 2015-0372546, Dec. 24, 2015.

* cited by examiner

DYNAMOELECTRIC MACHINE HAVING A THERMOSIPHON

CROSS-REFERENCES TO RELATED APPLICATIONS

This application is the U.S. National Stage of International Application No. PCT/EP2017/060752, filed May 5, 2017, which designated the United States and has been published as International Publication No. WO 2017/207212 and which claims the priority of European Patent Application, Serial No. 16172866.2, filed Jun. 3, 2016, pursuant to 35 U.S.C. 119(a)-(d).

BACKGROUND OF THE INVENTION

The invention relates to a hollow shaft, which forms a closed cavity, which has at least an evaporator zone and a condenser zone axially, to the production of such a hollow shaft and to its use in dynamo-electric machines.

Rotary dynamo-electric machines cool, inter alia, their rotors, normally with a cooling air flow caused by an axial fan. If, however, the thermal load of the rotor is relatively large, such a cooling air flow is no longer sufficient. Hollow shafts are then provided which contain a cooling medium, which discharges the heat of the rotor outwards and axially outwards via this shaft.

Therefore, for example, DE 10 2009 051 114 A1 discloses an electric machine comprising, inter alia, a rotor, wherein the rotor has a hollow shaft and wherein a closed cavity is formed by means of the hollow shaft, wherein the closed cavity is provided for receiving a coolant, wherein a three-dimensional transport structure for transporting the coolant is provided in the closed cavity. The resulting heat is therefore axially transferred to the outside via this transport structure and is re-cooled there by way of a cooling air flow.

One disadvantage in this case is that, in order to achieve a re-cooling, corresponding large re-cooling surfaces have to be provided in order to obtain sufficient cooling of the rotor.

SUMMARY OF INVENTION

Taking this as a starting point, the invention is based on the object of providing a hollow shaft with sufficient re-cooling surfaces. The aim of the invention is to minimize the axial extension of the hollow shaft. Furthermore, a comparatively higher efficiency of a dynamo-electric machine should also be achieved thereby with simultaneous compactness.

The stated object is achieved by a hollow shaft which forms a closed cavity, which has at least an evaporator zone and a condenser zone axially, wherein at least the condenser zone has a microscale structure, and wherein the evaporator zone and the condenser zone can be connected in a thermally conductive manner to the respective surrounding elements thereof.

The stated object is also achieved by a rotor having a hollow shaft as set forth above, wherein in particular the evaporator zone is arranged in the region of a laminated core of the rotor.

The stated object is likewise achieved by a dynamo-electric machine having a rotor which has a hollow shaft of this kind.

The stated object is likewise achieved by a method for producing a hollow shaft which forms a closed cavity which surrounds at least an evaporator zone and a condenser zone axially, wherein at least the condenser zone has a microscale structure, and wherein the evaporator zone and the condenser zone can be connected in a thermally conductive manner to the respective surrounding elements thereof by the following steps:
- providing a hollow shaft segment, wherein the hollow shaft segment is produced by machining and has at least one centric hole,
- axial attachment of a further shaft section by additive manufacturing, in particular by 3D printing, wherein a microscale structure is produced in the axial extension of the hollow shaft segment.

Owing to the microscale structure in the region of the condenser zone, the condenser surface is therefore designed to be comparatively large and sufficient re-cooling of the previously evaporated cooling medium occurs on a comparatively small installation space, viewed axially. According to the invention, a rotor having a thermosiphon is therefore provided which has an increased efficiency in the condenser region or condenser zone. This has an advantageous effect on the efficiency and compactness of the dynamo-electric machine.

Advantageously, this microscale structure is provided by an additive manufacturing method. In this case, the region of the condenser, as a condenser zone, is accordingly "pressed" axially directly onto a hollow shaft segment. This production process therefore represents a linking of conventional production method to a new production method, the additive manufacturing method.

In this case the hollow shaft segment is, for example, cast, rotated, drilled, in other words provided by means of conventional production methods, with the axial region, in particular the condenser zone, forming on the segment a microscale structure with its structural elements produced by means of additive manufacturing, such as ribs, webs, pins, knobs, pores or hollow bodies. The hollow shaft segment is therefore at least mechanically connected, above all, to a wall of the condenser zone.

In a further embodiment the condenser zone has different materials in order to comply with the respective requirements in respect of heat conduction, hardness and strength of the respective sections of the condenser zone (such as, for example wall, microscale structure, pins).

According to the invention, the efficiency of the dynamo-electric machine is increased by means of the inner contour of the condenser zone through special structures, such as, for example fine rod-shaped elements, pore-wise cross-linkings, etc. This is inventively achieved by way of an additive production method in that narrow material webs of 0.1 mm to a few millimeters, and gaps of 0.01 mm to approximately 2 mm or more can be achieved. A preferred thickness of the material webs is approximately 1 mm, a preferred gap width is approximately 0.5 mm. The considerable enlargement of the surface, which is brought about in this way, above all in the interior of the condenser zone, increases the efficiency of re-cooling of this condenser. Such microscale 3D structures cannot be implemented or can be implemented only in a very complicated manner using other conventional production methods, for example, machining methods.

The additive production method also allows permanent gas tightness and permanent strength between the hollow shaft segment and the condenser zone, above all the wall of the condenser zone. As a result of the condensation of an evaporator liquid in this microscale structure, a film is now formed on the inner side of the condenser zone. However, this film has not previously hindered contact of the steam with the in particular cooler surface, as a result of which the condensation process is blocked or at least prevented. By forming the inventively fine webs, ribs, gaps or pores by way of an additive production method, it is now ensured in any case that steam comes to rest on the comparatively cool inner contour and therefore condensation of the cooling medium, in other words the evaporator liquid, can occur.

In addition, the inner region of this condenser is formed conically in the direction of the evaporator zone in order to convey the condensate away from the condensation surface in the direction of the evaporator zone by the axial component of the centrifugal force during operation of the dynamo-electric machine. A more than sufficient conveying effect of the cooling medium within the hollow shaft is therefore provided.

The cooler surrounding the condenser zone is designed in particular as a fan which includes a high thermal conductivity value. This leads to efficient cooling of the condenser zone together with an air current generated by the fan during operation of the dynamo-electric machine.

The fan is preferably made of a material with good thermal conductivity such as aluminum, copper or aluminum alloys or copper alloys. In order to dissipate the heat from the condenser zone it is advantageous if the condenser zone is likewise made of highly thermally conductive material such as aluminum, copper, aluminum alloys or copper alloys.

In a further embodiment the condenser zone has different materials in order to comply with the respective requirements in respect of heat conduction, hardness and strength of the respective section of the condenser zone.

The materials such as aluminum, copper, aluminum alloys or copper alloys are soft material. In the case of a bearing replacement, however, it is necessary to axially remove the fan from the hollow shaft. In order to avoid a cold welding of the two edge zones of the internal diameter of the fan and the external diameter of the condenser zone when the fan is removed, the outer layer of the condenser zone, in other words the seat of the fan, has, at least in sections, a harder structure than the soft material. A suitable harder material is, for example, steel.

This prevents cold welding of the two edge zones of internal diameter of the fan and the external diameter of the condenser zone during removal of the cooler.

In a further embodiment the surface of the condenser zone has both materials, in other words effectively heat-conducting materials alternate according to a predetermined pattern with comparatively hard sections and possibly with materials having less good heat conductivity. A sufficient heat dissipation from the condenser zone to the fan is therefore created. The material having good thermal conductivity projects in sections—in other words, in the sections in which the harder material is not present, to the external diameter of the condenser zone. In the case of a dismantling of the cooler, the harder material takes over the supporting function, wherein a rubbing of the surface, in other words a cold welding, is avoided.

The condenser zone therefore has a microscale structure on the inside while it has two different materials on the outside in order to avoid both heat conduction to the fan and the cold welding in the event of maintenance-related removal of the fan.

BRIEF DESCRIPTION OF THE DRAWING

The invention and further advantageous embodiments will be described in more detail with reference to the exemplary embodiments illustrated in principle. In the drawings.

DETAILED DESCRIPTION OF PREFERRED EMBODIMENTS

Figure 1:
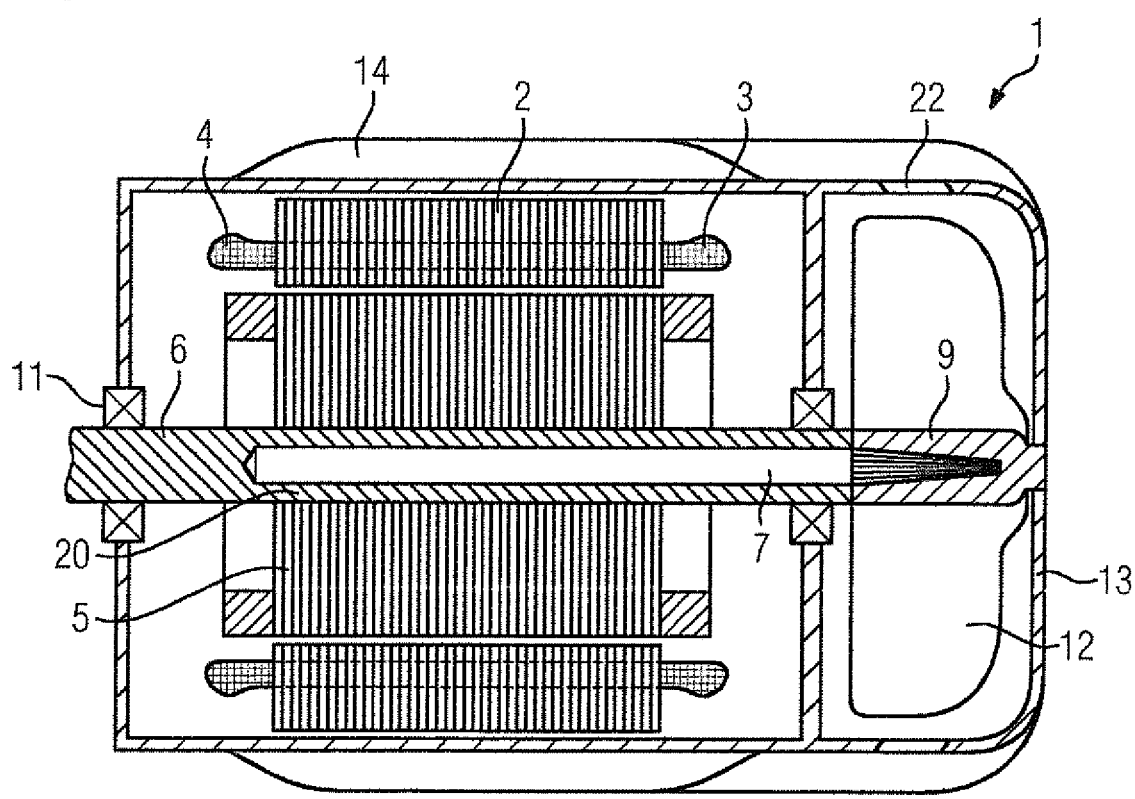
FIG. 1 shows a principal longitudinal section through a dynamo-electric rotary machine.

FIG. 1 shows a rotary dynamo-electric machine 1 which has a stator 2 and a rotor 5. In this embodiment the rotor 5 is designed as a cage rotor, but can also be a permanently excited rotor, a rotor of a reluctance machine or a rotor having a winding system.

The rotor 5 is connected in a rotationally fixed manner to a hollow shaft 6, with the hollow shaft 8 being mounted in bearings 11. A rotationally fixed connection should be taken to mean a torque-transmitting connection, such as, for example a shrink bond or a feather key connection or another shaft-hub connection between the laminated core of the rotor 5 and the hollow shaft 8. A housing of the electric machine 1 carries the bearing shields. Axially extending cooling ribs 14 are located on the housing radially outside the stator 2, and these guide a cooling air flow generated by a fan 12 along the housing. The fan 12 is accommodated in a fan guard 13 which optionally has openings 22.

Figure 6:
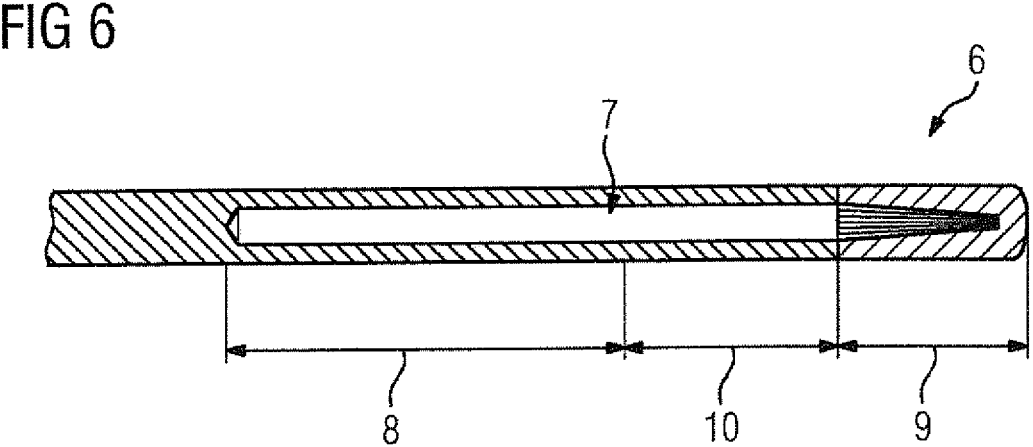
FIG. 6 shows a longitudinal section through a hollow shaft.

In this embodiment the hollow shaft 6 is formed in a hollow manner by a central axial recess 7, for example a hole, and according to FIG. 6 has an evaporator zone 8 in the region of the rotor 5, optionally a transport zone 10, and a condenser zone 9. The axial extent of the evaporator zone 8 of the hollow shaft 6 corresponds at least to the axial extent of the laminated core of the rotor 5.

In this embodiment the hollow shaft 6 has a central hole, but it is also conceivable for a plurality of axially parallel holes to be provided which then open into the correspondingly configured condenser zone 9.

The cooling medium, for example an evaporator liquid, is re-cooled in the condenser zone 9. In this case, it is decisive that in a comparatively axially short region—in other words the condenser zone 9—efficient re-cooling of the evaporator liquid occurs in order to therefore ensure an adequate cooling efficiency of the entire dynamo-electric machine 1. The comparatively axially short section of the condenser zone 9 also ensures a compact design of the dynamo-electric machine 1.

Figure 2:
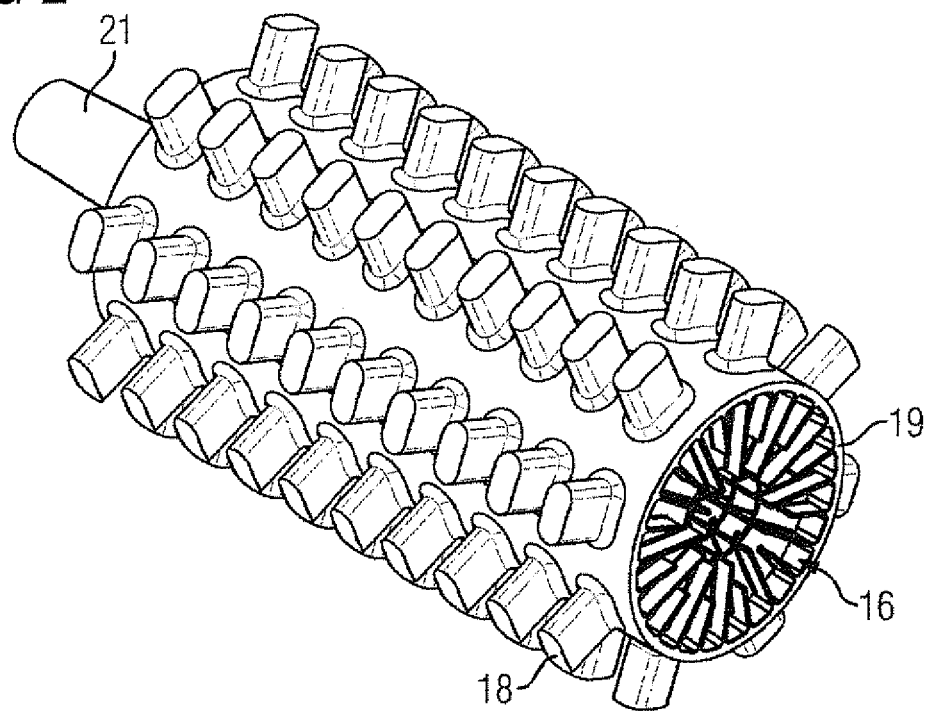
FIG. 2 shows a microscale structure of the condenser zone.
Figure 4:
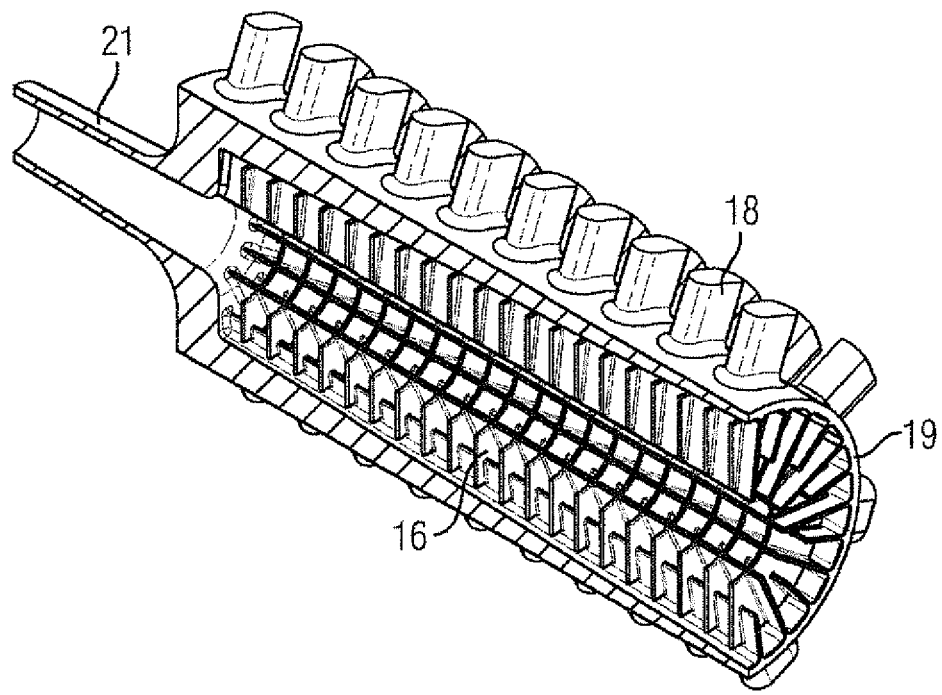
FIG. 4 shows a further microscale structure of the condenser zone.

A condenser zone 9 of this type can be designed so as to be very microscale by way of additive production methods, as illustrated, for example, in FIG. 2 and FIG. 4. The individual web widths, rib heights, web diameters, spacings of the webs/ribs are in the millimeter range and/or therebelow. Therefore, a sufficient area is created which ensures an efficient re-cooling effect of the cooling medium. FIG. 2 shows the core of the condenser zone 9, which is designed in the manner of a roller brush. These microscale condenser surfaces of the inner cavity 7 are in good heat-conducting contact with pins 18. The harder material, in other words, for example the shaft material 17, is arranged around these pins 18. The heat is passed on to the fan 12 via these pins 18.

Suitable additive production methods for processing metals for producing the condenser zone 9 are, above all, selective laser sintering and selective laser melting with an energy input, which is particularly suitable for this production, of approximately highest nominal laser power (NLP) of 1.6 to 2.5 Ws/mm². In this way sufficient sealing and mechanical stability is achieved between the hollow shaft segment 20 and condenser zone 9. Local undesirable effects due to overheating must be expected above this energy input. Below this energy input, increasing pore formation occurs, which optionally impairs the gas tightness and/or the mechanical strength.

In addition, by way of suitable additive production methods, the structure of the condenser zone 9 can be implemented with a plurality of materials, in particular two materials.

Figure 3:
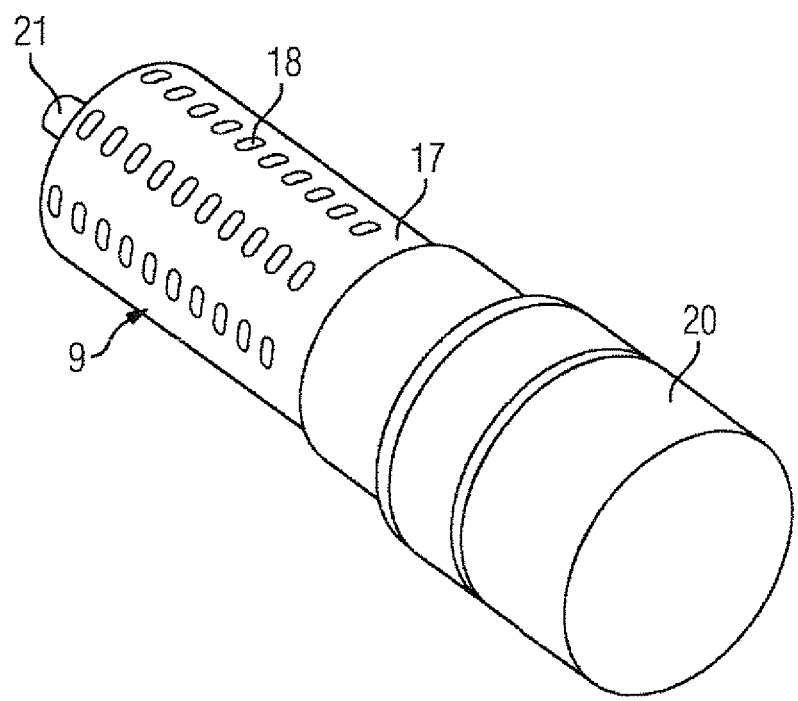
FIG. 3 shows a perspective view of the condenser zone.

FIG. 3 shows the pressed-on region of the condenser zone 9 on a hollow shaft segment 20, which together then form the hollow shaft 6. Materials of different hardness and thermal conductivity are present on the surface of the condenser zone 9 in order to ensure a sufficient seat of a fan 12 on the condenser zone 9, which acts as a cooler.

In this case, the pins 18 with good heat conductivity and having the harder shaft material 17 alternate both in the axial direction and in the circumferential direction. The areal ratios of the two materials depend on the required heat transport and the fastening of the fan 12 to the condenser zone 9.

This combination of two different materials in or on the condenser zone 9 avoids cold welding between the materials of the condenser zone 9 and of the internal diameter of the fan 12 when the fan 12 is removed the hollow shaft 7. This is necessary, for example, in order to replace a bearing.

The condenser zone 9, in other words the axial section, which is connected to a hollow shaft segment 20, is now constructed as follows:

There is a re-cooling region having the microscale structure 16 as described above, with this structure 16 being connected in a thermally conductive manner to the wall 19 of the condenser zone 9. The aforementioned essentially radially arranged heat-conducting elements, such as radial knobs or pins 18, are arranged radially outside the wall 19. These heat-conducting elements can have a very wide variety of geometric cross-sectional shapes. As a result, the condenser zones 9 can have both identical knob or pin shapes and a wide variety of knob shapes.

Figure 5:
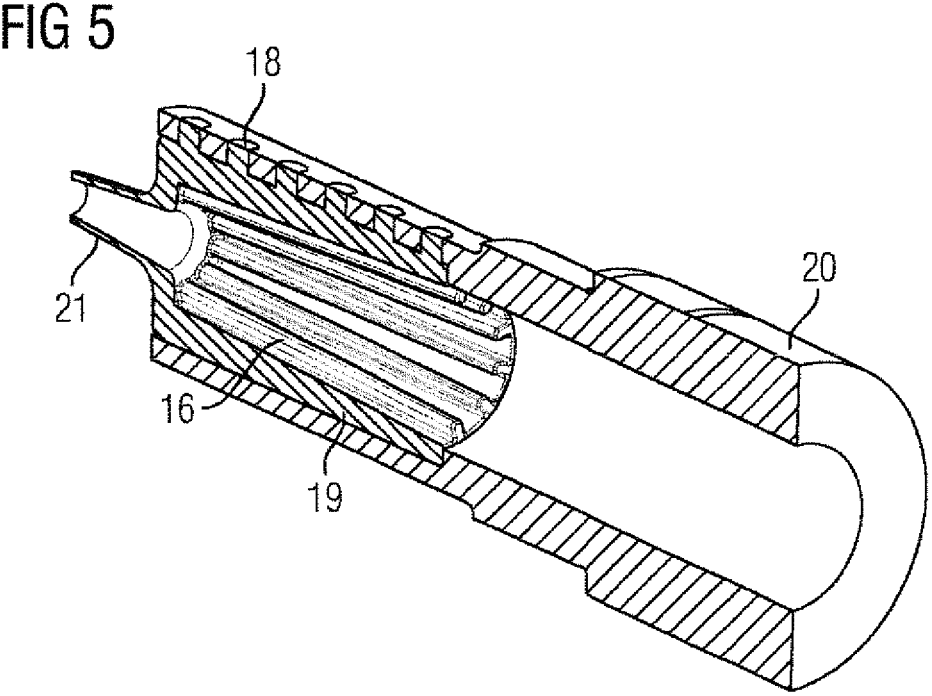
FIG. 5 shows axially extending ribs on a conically shaped element in the condenser zone.

FIGS. 4 and 5 show further fine microscale structures 16, which are partially designed in the interior with an essentially conical profile in the direction of the evaporator zone 8, in order to obtain a corresponding return transport of the cooling medium into the evaporator zone 8 of the hollow shaft 6.

The microscale structure 16 has, in principle, ribs and/or prisms and/or hollow bodies and/or surface-enlarging structures.

FIG. 5 shows, in a longitudinal section, the hollow shaft segment 20 to which the condenser zone 9 adjoins axially. The heat-conducting pins project essentially radially from the heat-conducting wall 19. Provided between the pins 18, as stated above, is the harder material, which, as in the present case, can be made of the material of the hollow shaft segment 20, but also another harder material.

FIG. 6 shows the axially running sections of the hollow shaft 6, with the hollow shaft 6 being pressed on in particular at an axial end of the condenser zone 9. The hollow shaft 6, which is designed as a thermosiphon, has, in the axial direction, an evaporator zone 8, optionally a transport zone 10 and the condenser zone 9. In this embodiment, the hollow shaft segment 20 has the evaporator zone 8 and a transport zone 10. In the evaporator zone 8, a cooling medium is evaporated while absorbing heat and is re-cooled in the condenser zone 9. Suitable filling bodies in the hollow shaft 6 can improve the transport of the evaporated and/or re-cooled cooling medium, in particular in the transport zone 10. This is particularly advantageous when the hollow shaft 6 is used in a wide variety of spatial arrangements, for example in the case of hollow shafts in vehicles which are on the move in difficult terrain.

The condenser zone 9 has an axially running connecting piece 21, via which, for example, the coolant can be supplied and/or the operating pressure of the thermosiphon can be set. The connecting piece 21 is closed during operation of the dynamo-electric machine 1 in order to be able to maintain the cooling circuit.

The rotor 5 has, as a magnetic flux-conducting element, an axially layered laminated core or an essentially cylindrical magnetic flux-guiding part formed in one piece. This magnetic flux-conducting element is connected in a rotationally fixed manner to the hollow shaft 6, in particular to the evaporator zone 8 or to the hollow shaft segment 20.

Such dynamo-electric machines 1 are used inter glia as a drive, in particular in vehicle engineering, in e-cars, rail vehicles, mining trucks, etc. since sufficient cooling of the rotor 5 is now provided even without open-circuit cooling. Open-circuit cooling in the case of highly dust-laden air and/or alternating operation of the motor with standstill times leads to insufficient cooling, above all of the rotor 5.

In vehicle engineering, compact powerful drives are required owing to the restricted space conditions predefined therein, and these drives are now achieved by way of a compact dynamo-electric machine 1.

What is claimed is:

1. A hollow shaft, comprising:
   a closed cavity having an evaporator zone and a condenser zone in an axial direction, with the evaporator zone and the condenser zone being connectable in a thermally conductive manner to surrounding elements thereof, said condenser zone including an inwardly microscale structure formed as a rib-like structure and/or pin-shaped structure and/or pore-like cross-linking and connected in a thermally conductive manner to a wall of the condenser zone, wherein the hollow shaft has different materials at least in a region of the condenser zone;
   a fan disposed in surrounding relation to the condenser zone, with the materials of the hollow shaft in the region of the condenser zone differing in hardness and thermal conductivity on a surface of the condenser zone on which the fan is arranged; and
   heat-conducting elements made from soft material and having a knob-shaped or pin-shaped configuration, said heat-conducting elements projecting radially outwards from the wall of the condenser zone, with a harder one of the materials of the hollow shaft being provided between the heat-conducting elements and around the heat-conducting elements.

2. The hollow shaft of claim 1, wherein the condenser zone is configured with an inner conicity.

3. The hollow shaft of claim 2, wherein the inner conicity of the condenser zone widens in a direction of the evaporator zone.

4. A rotor, comprising a hollow shaft, said hollow shaft comprising a closed cavity having an evaporator zone and a condenser zone in an axial direction, with the evaporator zone and the condenser zone being connectable in a thermally conductive manner to surrounding elements thereof, said condenser zone including an inwardly microscale structure formed as a rib-like structure and/or pin-shaped structure and/or pore-like cross-linking and connected in a thermally conductive manner to a wall of the condenser zone, wherein the hollow shaft has different materials at least in a region of the condenser zone, a fan disposed in surrounding relation to the condenser zone, with the materials of the hollow shaft in the region of the condenser zone differing in hardness and thermal conductivity on a surface of the condenser zone on which the fan is arranged, and heat-conducting elements made from soft material and having a knob-shaped or pin-shaped configuration, said heat-conducting elements projecting radially outwards from the wall of the condenser zone, with a harder one of the materials of the hollow shaft being provided between the heat-conducting elements and around the heat-conducting elements.

5. The rotor of claim 4, further comprising a magnetic flux-conducting laminated core, said evaporator zone being arranged in a region of the laminated core or another magnetic flux-conducting element of the rotor.

6. A dynamo-electric machine, comprising:
a stator;
a rotor interacting with the stator, said rotor comprising a hollow shaft which includes a closed cavity having an evaporator zone and a condenser zone in an axial direction, with the evaporator zone and the condenser zone being connectable in a thermally conductive manner to surrounding elements thereof, said condenser zone including an inwardly microscale structure formed as a rib-like structure and/or pin-shaped structure and/or pore-like cross-linking and connected in a thermally conductive manner to a wall of the condenser zone, wherein the hollow shaft has different materials at least in a region of the condenser zone, a fan disposed in surrounding relation to the condenser zone, with the materials of the hollow shaft in the region of the condenser zone differing in hardness and thermal conductivity on a surface of the condenser zone on which the fan is arranged, and heat-conducting elements made from soft material and having a knob-shaped or pin-shaped configuration, said heat-conducting elements projecting radially outwards from the wall of the condenser zone, with a harder one of the materials of the hollow shaft being provided between the heat-conducting elements and around the heat-conducting elements; and
a cooler for providing a cooling effect.

7. The dynamo-electric machine of claim 6, wherein the cooler is a fan which is connected in a thermally conductive manner to the condenser zone.

8. A method for producing a hollow shaft, said method comprising:
machining a hollow shaft segment such as to form a centric hole to thereby define a closed-off cavity with an evaporator zone and a condenser zone in an axial direction;
axially attaching a further shaft section by way of additive manufacturing such as to produce the condenser zone with an inwardly microscale structure in an axial extension of the hollow shaft segment and to connect the microscale structure in a thermally conductive manner to a wall of the condenser zone;
providing materials of different hardness and thermal conductivity on a surface of the condenser zone by arranging heat-conducting elements of soft material and of knob-shaped or pin-shaped configuration such as to project radially outwards from the wall of the condenser zone; and
providing a harder one of the materials between the heat-conducting elements and around the heat-conducting elements.

9. The method of claim 8, further comprising disposing a fan in surrounding relation to the condenser zone.

10. The method of claim 8, wherein the additive manufacturing includes 3D printing.

11. The method of claim 8, further comprising connecting the evaporator zone and the condenser zone in a thermally conductive manner to surrounding elements.

12. The method of claim 8, further comprising forming a predetermined pattern at least on the surface of the condenser zone by the different materials.

13. A method for producing a rotor, said method comprising:
producing a hollow shaft by machining a hollow shaft segment such as to form a centric hole to thereby define a closed-off cavity with an evaporator zone and a condenser zone in an axial direction, axially attaching a further shaft section by way of additive manufacturing such as to produce the condenser zone with an inwardly microscale structure in an axial extension of the hollow shaft segment and to connect the microscale structure in a thermally conductive manner to a wall of the condenser zone, providing materials of different hardness and thermal conductivity on a surface of the condenser zone by arranging heat-conducting elements of soft material and of knob-shaped or pin-shaped configuration such as to project radially outwards from the wall of the condenser zone, and providing a harder one of the materials between the heat-conducting elements and around the heat-conducting elements; and
connecting a magnetic flux-conducting laminated core or another magnetic flux-conducting element in a rotationally fixed manner to the hollow shaft.

14. The method of claim 13, wherein the laminated core or the other magnetic flux-conducting element is connected in a rotationally fixed manner to the evaporator zone of the hollow shaft.

15. A transportation device selected from the group consisting of vehicle, e-car, rail vehicle, and mining truck, comprising a dynamo-electric machine said dynamo-electric machine comprising a stator, a rotor interacting with the stator, said rotor comprising a hollow shaft which includes a closed cavity having an evaporator zone and a condenser zone in an axial direction, with the evaporator zone and the condenser zone being connectable in a thermally conductive manner to surrounding elements thereof, said condenser zone having an inwardly microscale structure formed as a rib-like structure and/or pin-shaped structure and/or pore-like cross-linking and connected in a thermally conductive manner to a wall of the condenser zone, wherein the hollow shaft has different materials at least in a region of the condenser zone, a fan disposed in surrounding relation to the condenser zone, with the materials of the hollow shaft in the region of the condenser zone differing in hardness and thermal conductivity on a surface of the condenser zone on which the fan is arranged, and heat-conducting elements made from soft material and having a knob-shaped or pin-shaped configuration, said heat-conducting elements projecting radially outwards from the wall of the condenser zone, with a harder one of the materials of the hollow shaft being provided between the heat-conducting elements and around the heat-conducting elements, and a cooler for providing a cooling effect.

16. The transportation device of claim 15, wherein the cooler is a fan which is connected in a thermally conductive manner to the condenser zone.

\* \* \* \* \*